United States Patent [19]

Kraszewski et al.

[11] 4,229,225

[45] Oct. 21, 1980

[54] CEMENT-BASED POWDERED WATER-REPELLENT COMPOSITION, AND ITS APPLICATIONS

[76] Inventors: Richard Kraszewski, 31450, Odars; Jean J. Damiguet, 66 Avenue Sainte Marie, 94160 Saint Mande, both of France

[21] Appl. No.: 59,155

[22] Filed: Jul. 20, 1979

[30] Foreign Application Priority Data

Aug. 3, 1978 [FR] France .................. 78 22961

[51] Int. Cl.$^2$ .................................. C04B 7/02
[52] U.S. Cl. ........................................ 106/99
[58] Field of Search ................................ 106/99

[56] References Cited

U.S. PATENT DOCUMENTS

| | | | |
|---|---|---|---|
| 3,834,916 | 9/1974 | Kesler | 106/99 |
| 4,054,472 | 10/1977 | Kondo et al. | 106/99 |
| 4,127,417 | 11/1978 | Okada et al. | 106/99 |
| 4,132,555 | 1/1979 | Barrable | 106/99 |

*Primary Examiner*—James Poer
*Attorney, Agent, or Firm*—David M. Ostfeld

[57] ABSTRACT

This invention relates to a cement-based powdered water-repellent composition, comprising, expressed as dry weight:
  (a) 20-60% of a cement,
  (b) 30-70% of an inorganic or organic filler,
  (c) 2-10% of a fibre selected from zirconium, hafnium, vanadium and cesium silicate fibres,
  (d) 0.2-1% of plasticizers for cement,
  (e) 1-3% of an adhesive,
  (f) 0.1-0.5% of a water-repellent.

This composition is useful for the production of coatings and molded products, having very high mechanical strength and water-repellent properties.

This composition may additionally contain 0.1-2% alkalinity-reducing buffer salts.

12 Claims, No Drawings

CEMENT-BASED POWDERED WATER-REPELLENT COMPOSITION, AND ITS APPLICATIONS

DESCRIPTION

This invention relates to a water-repellent cement-based composition reinforced with glass fibres which possesses particularly useful mechanical properties.

This composition is typically applicable to the formation of weather-resistant coatings and to the manufacture of molded articles.

The composition of this invention comprises, expressed as dry weight:
(a) 20–60% cement,
(b) 30–70% inorganic or organic filler,
(c) 2–10% zirconium, hafnium, vanadium or cesium silicate fibres,
(d) 0.2–1% plasticizers for cement,
(e) 1–3% adhesive,
(f) 0.1–0.5% water-repellent.

According to another feature, the composition comprises additionally 0.1–2% buffer salts which reduce the alkalinity of the composition. The use of said buffer salts constitutes a preferred embodiment in cases where the alkalinity of the cement is too high.

The buffer salts may typically comprise suitable phosphates such as disodium orthophosphates, or may comprise borax.

If desired, this composition may comprise, per 100 parts by weight of the preceding composition, 1–20 parts by weight of a coloring agent, 0.1–0.5 parts by weight of an air removing agent, 0.1–0.5 parts of a water-retaining agent. Setting promoters, setting retardants or wetting agents may also be added, if desired.

The inorganic or organic filler is selected from inorganic components such as silica and alumina containing fillers, carbonates, sulfates and metal filings; and the organic filler may be selected from the group of synthetic or natural plastic materials.

The composition of this invention is obtained as a powder of a particle size which is dependent on the size of its components.

It is diluted with water prior to application, in order to obtain a more or less consistent paste, depending on the use contemplated.

The composition of this invention is prepared by mixing the various ingredients together, preferably according to a two-step procedure. In a first step, the fibres (e.g. zirconium silicate) are mixed with the adhesive, and the water-repellent agent is then added. In a second step, the cement and plasticizer, already dispersed in the filler, are added to the first mixture thus obtained.

When buffer salts are used, it is preferred to mix these first with the fibres and to render this buffer effect more durable, the adhesive is added to said mixture of fibres and salts, and the preparation is completed as described above.

The cement used in the composition of this invention may be any slow setting cement or fast setting cement (aluminous).

The filler used is a powder having a particle size from $1\mu$ to 10 mm. It is selected from the following materials:

(1) silica or alumina containing materials such as sand, ground silica, colloidal or precipitated silica, and corindon;

(2) carbonates such as natural or surface treated magnesium or calcium carbonate, or a calcium, potassium, barium or magnesium carbonate such as dolomie, for example;

(3) sulfates such as calcium sulfate, for example plaster and gypsum, or potassium sulfates;

(4) insulating materials, particularly expanded materials, such as clays, glass, surface-treated wood, pumice, pouzzolane, micas such as vermiculite, perlite and celite, light concretes, plastics such as polystyrene, polyurethane, polyethylene, polyvinyl resins, urea-formaldehyde resins, combustion residues;

(5) metal filings such as iron filings.

One of the essential components of the composition of this invention is component (c), i.e. zirconium, hafnium, vanadium or cesium silicate fibres having from 0.3 mm to 20 cm in length and having a diameter of up to 10 mm. The length of the fibres is dependent on the end use contemplated and on the means of application used.

The plasticizer used in a material suitable for the cement grade used, and is, for example, natural limestone, an alkyl-aryl sulfonate or a ligno-sulfite.

The adhesives used in the composition of this invention are vinylic and acrylic polymers, copolymers and terpolymers, styrene-butadiene type adhesives, epoxy resins, or natural adhesives such as gelatin, casein, starch derivatives and cellulose derivatives.

By "derivatives", are meant alcohols, ethers and esters such as acetates, and halides such as the chlorides.

The water-repellent agent used is a conventional agent such as zinc, magnesium, sodium or potassium stearates or oleates, or powdered silicones, or diatomites.

For application purposes, the product may be formulates as one or two separate components. When formulated as two separate components, one of these comprises zirconium silicate fibres and the other is available as a powder comprising the other components.

To prepare the product prior to its application on a substrate, it is mixed with water at a rate of 10–40 wt% water with respect to the weight of the dry composition.

The composition may be applied to a substrate by any suitable conventional means, such as with a hawk, a brush, a gun, in a thickness of at least 3 mm.

This product is useful as a coating for the restoring and the strengthening of old substrates and old facings, as a product for filling cracks and as sealing material. It is also obviously useful on new substrates to give facade coatings, for example.

The composition of this invention is also useful for the manufacture of cast, projection- or injection-molded products.

It is also possible to contemplate the production of decorative or other panels, obtained by projection of said composition.

It should be noted that this composition makes it possible to obtain thin coatings or plates (of 3–10 mm thickness, for example) over large surfaces (of up to 15 m$^2$).

Application of a coating material prepared with the composition of this invention replaces the multiple layers of a conventional hydraulic coating. For example, when repairing a house facade, this coating may be applied directly after removal of the non-adhering portions.

The dry coating obtained with the composition of this invention is particularly water-tight (to rain for example), it is imputrescible, fireproof and thermally insulating and soundproof depending on the filler used.

After application on a substrate and curing, the coating of this invention forms a rigid shell which holds the substrate together; thus, in the case of a facade coating, it forms a true reinforcing belt for the walls, which maintains its cohesion, even if some underlying portions of the facade are no longer adherent.

The following non-limiting Example is given to illustrate this invention.

EXAMPLE 1

A coating composition is prepared, which comprises the following ingredients in the amounts given:

| | |
|---|---|
| white cement CPA 500 (or CPA 400) | 50% |
| silica (0–600 μ) | 43.7% |
| zirconium silicate fibres (24 mm in length) | 3% |
| alkyl aryl sulfonate plasticizer (Ribalite) | 0.1% |
| vinylic adhesive | 2% |
| buffer salts (Na orthodiphosphate) | 1% |
| Mg stearate water-repellent agent | 0.2% |

This composition is prepared by first mixing together the zirconium silicate fibres with the buffer salt and the adhesive, then by adding the desired amount of stearate, and finally by adding to the resulting mixture the cement dispersed in the silica filler.

To demonstrate the mechanical properties of the resulting coating, a sheet of expanded polystyrene having a thickness of 1 cm is coated with a 6 mm thick layer of a coating material prepared from the above composition to which 20 wt% water has been added.

After drying for 28 days at 20° C. and a relative humidity of 65%, the perforation resistance is demonstrated by testing with a Martinet & Baronnie Perfo-Test device, according to the C.S.T.B. (Centre Scientifique et Technique du Bâtiment) standards. This test comprises projecting a punch with a determined inertia against the surface of the coating and determining the depth of the perforation.

With a 4 mm diameter punch, a 1 mm deep imprint is produced on the surface of the coating, but there is neither perforation nor depression in the soft polystyrene layer.

With a 6 mm diameter punch, no trace of deterioration may be detected on the surface of the coating.

An impact test is also carried out with a ball having an energy of 3.75 Joules, again with the Perfo-Test device, according to C.S.T.B. standards. With this test, there is again no observable deterioration of the surface condition of the coating.

The results of the above-mentioned tests give a rating of P=4 according to C.S.T.B. standards.

To demonstrate the flexural strength of a coating layer prepared with the composition of this invention, the following test is carried out.

A sample 150 mm long, 30 mm wide (designated a) and 6 mm thick (designated b) is prepared by casting the composition of Example 1 in a mold of corresponding size.

This sample is placed lengthwise on two parallel rectilinear supporting bars, situated at a distance of 135 mm (designated L), and two weights, corresponding to a total weight P, are applied on the surface of the sample, at two points situated between the supporting members and at a distance L/3 from each supporting member.

The modulus at break is calculated according to the formula:

$$\text{Modulus at break} = P \times L / ab^2$$

In this Example, it is equal to 210 kg/cm².

It is apparent, from the combined results of the above tests, that the resulting coating has not only a great hardness but also is capable to withstand the flexural and tear stresses encountered in the course of the movements of the fabric of a building to which the coating is applied.

Said test values and results are obtained only by conforming to the specific amounts stated for the various components and to their order of incorporation.

The composition of this invention may typically be used for the production of members for collecting solar energy.

Said members comprise a cured mass of the composition in which are provided circulation channels for a heat-carrying fluid.

Thus, for example, may be embedded in the composition tubes having a cylindrical or other form, made of a suitable material, such as a plastic material, steel, or cast iron, said tubes being interconnected to provide a path for a heat-carrying fluid, and being also connected by an outer circuit with an accumulation or heat-exchange device.

Since the composition of this invention may contain as filler a thermally conducting material (metal filings), the circulation channels for the heat-carrying fluid are placed under a layer of such a composition, the outer surface of which is exposed to solar radiations. However, for reduced heat losses, a composition filled with an insulating material such as pouzzolane, perlite, polystyrene beads, expanded slag, expanded concrete, pumice, is used on the other side of the channels, with respect to the surface exposed to solar radiations.

This provides both a good recovery of the heat due to solar radiations and a thermal insulation of the other surface of the member. This application is typically useful for the production of exterior coatings for house buildings or other buildings.

Such an application may also be contemplated in the case of panels to be placed on roofs or terraces, in which case the outer surface may imitate roof tiles or slates, depending on the shape of the mold used to produce such panels. In such an application, the use of a thin layer of a composition solely filled with conducting materials may be more advantageous, to decrease the weights suspended.

Examples of such an application are given below.

EXAMPLE 2

On the outer walls made of brick, parpen or concrete of a building, is applied, at a thickness of about 3 cm, an insulating coating comprising the following composition, diluted with water:

| | |
|---|---|
| Cement | 30% |
| Fibers (Zr silicate) | 2% |
| Plasticizer (ligno-sulfite) | 0.2% |
| Cellulosic adhesive | 2% |
| Buffer salts (borax) | 1% |
| Water-repellent agent (Mg stearate) | 0.1% |

| | |
|---|---|
| -continued | |
| Expanded slag | 64.7% |

This composition provides a mortar having a specific gravity of about 0.4 in its dry form. Small diameter plastics material (about 0.2 cm to about 0.5 cm) pipes are then bound to this coating either mechanically (stapling) or by means of an adhesive, said pipes being interconnected to provide a flow path for a heat-carrying fluid such as water.

Over the first coating layer and the pipes is then applied a second layer (having a thickness of about 8 mm) of a thermally conducting coating having the following composition:

| | |
|---|---|
| Cement | 40% |
| Zr silicate fibres | 5% |
| Plasticizer (ligno-sulfite) | 0.2% |
| Adhesive (vinyl-versatate terpolymer) | 2% |
| Buffer salts (borax) | 1% |
| Coloring agent | 0.1% |
| Silica | 45% |
| Metal filings | 8% |

The following combinations of insulating coating, of water-circulation pipes, and of thermally conducting coating constitutes a member for collecting solar energy which makes it possible to recover energy by the heating of water which is typically useful for heating purposes or for domestic water use, and which nevertheless is useful for the thermal insulation of the building.

EXAMPLE 3

This Example illustrates the manufacture of panels comprising roofing members.

In a metal or polyester mold, the bottom of which reproduces the shape of roofing coatings such as tiles or slates, having a size of 1 m × 1 m, is projected a mortar (in a thickness of 6 mm) having the following composition:

| | |
|---|---|
| Cement | 50% |
| Zr silicate fibres | 6% |
| Plasticizer (alkyl-aryl sulfonate) | 0.2% |
| Adhesive (vinyl-ethylene) | 2% |
| Buffer salts (Na orthophosphate) | 1% |
| Water-repellent agent (silicone) | 0.2% |
| Fine silica | 32.6% |
| Thermally conducting filler (iron filings) | 8% |

A small diameter (0.2–0.5 cm) coil-shaped plastic tube is then adhered to the mortar layer applied in the bottom of the mold, and a new layer of mortar having the above composition, but additionally comprising a coloring agent, is applied over the resulting combination. The layer applied has a thickness such that it provides a 6 mm thickness over the plastic tubing.

The edges of the panels are shaped in such manner that they permit rabbeting with adjacent panels, and the tubes of two adjacent panels are interconnected to provide a flow path for the heat-carrying fluid.

Having now described our invention what We claim as new and desire to secure by Letters Patent is:

1. Cement-based powdered water-repellent composition, comprising, expressed as dry weight:
   (a) 20–60% of a cement,
   (b) 30–70% of an inorganic or organic filler,
   (c) 2–10% of a fibre selected from zirconium, hafnium, vanadium and cesium silicate fibres,
   (d) 0.2–1% of plasticizers for cement,
   (e) 1–3% of an adhesive,
   (f) 0.1–0.5% of a water-repellent.

2. Composition as claimed in claim 1, additionally comprising 0.1–2% of alkalinity-reducing buffer salts.

3. Composition as claimed in claim 2, wherein said buffer salts are selected from phosphates and borax.

4. Composition as claimed in claim 1, wherein the inorganic filler is selected from silica and alumina fillers, carbonates, sulfates and metal filings, and the organic filler is selected from natural and synthetic plastic materials, in powdered form having a particle size of $1\mu$ to 10 mm.

5. Composition as claimed in claim 1, wherein the silicate fibres have a diameter of up to 10 mm and a length of 0.3 mm to 20 cm.

6. Composition as claimed in claim 1, wherein the plasticizer is selected from natural limestone, an alkyl-aryl sulfonate and a lignosulfite.

7. Composition as claimed in claim 1, wherein the adhesive is selected from vinylic and acrylic polymers, copolymers and terpolymers, styrene-butadiene adhesives, epoxy resins and natural adhesives selected from gelatin, casein, starch derivatives and cellulose derivatives.

8. Composition as claimed in claim 1, wherein the water-repellent agent is selected from zinc, magnesium, sodium and potassium stearates and oleates, powdered silicones, and diatomites.

9. Composition as claimed in claim 1, comprising additionally, per 100 parts by weight of the composition of claim 1, 1–20 parts by weight of a coloring agent, 0.1–0.5 parts by weight of an air-removing agent, 0.1–0.5 parts by weight of a water-retaining agent.

10. Process for the preparation of a cement-based powdered water-repellent composition, comprising, expressed as dry weight:
    (a) 20–60% of a cement,
    (b) 30–70% of an inorganic or organic filler,
    (c) 2–10% of a fibre selected from zirconium, hafnium, vanadium and cesium silicate fibres,
    (d) 0.2–1% of plasticizers for cement,
    (e) 1–3% of an adhesive,
    (f) 0.1–0.5% of a water-repellent,
comprising first mixing the silicate fibres, optionally together with the buffer salts and the adhesive, then adding the water-repellent agent, and then adding to the resulting mixture the cement and the plasticizer previously dispersed in the filler.

11. Coating or molded product, prepared with a cement-based powdered water-repellent composition, comprising, expressed as dry weight:
    (a) 20–60% of a cement,
    (b) 30–70% of an inorganic or organic filler,
    (c) 2–10% of a fibre selected from zirconium, hafnium, vanadium and cesium silicate fibres,
    (d) 0.2–1% of plasticizers for cement,
    (e) 1–3% of an adhesive,
    (f) 0.1–0.5% of a water-repellent,
diluted with 10–40 wt% water with respect to its weight, and then applied to a substrate or a mold by any suitable means.

12. Member for collecting solar energy, comprising a cured cement-based powdered water-repellent composition, comprising, expressed as dry weight:
    (a) 20–60% of a cement, (b) 30–70% of an inorganic or organic filler,
(c) 2–10% of a fibre selected from zirconium, hafnium, vanadium and cesium silicate fibres,
(d) 0.2–1% of plasticizers for cement,
(e) 1–3% of an adhesive,
(f) 0.1–0.5% of a water-repellent,
in which are provided channels for the flow of a heat-carrying fluid.

* * * * *